United States Patent [19]

Fowler

[11] Patent Number: 5,072,675

[45] Date of Patent: Dec. 17, 1991

[54] APPARATUS AND METHOD FOR THE DESTRUCTION OF WASTE

[76] Inventor: Benjamin P. Fowler, 805 S. Country Club Dr., LaPorte, Tex. 77571

[21] Appl. No.: 685,146

[22] Filed: Apr. 15, 1991

[51] Int. Cl.⁵ .............................................. F23G 5/12
[52] U.S. Cl. .................................. 110/346; 48/197 A; 110/229; 110/238; 110/242; 110/234
[58] Field of Search ............... 110/346, 238, 242, 229, 110/234; 48/197 A, 111, 65

[56] References Cited

U.S. PATENT DOCUMENTS

| | | | |
|---|---|---|---|
| 4,718,362 | 1/1988 | Santen et al. | 110/346 |
| 4,840,129 | 6/1989 | Jelinek | 110/229 |
| 4,848,249 | 7/1989 | Lepori et al. | 110/229 X |
| 4,896,497 | 1/1990 | Pillai | 110/229 X |

Primary Examiner—Edward G. Favors
Attorney, Agent, or Firm—Harrison & Egbert

[57] ABSTRACT

A process for the destruction of waste including the steps of passing an organic waste into a chamber, pumping an inert gas into the chamber until the pressure within the chamber is at least 10,000 p.s.i., heating the chamber to a temperature in excess of 300° F., dissociating the organic waste into its gaseous constituents, and passing the gaseous constituents from the chamber. The chamber is filled with an inert gas so as to displace oxygen from the chamber. The pressurized gaseous constituents are delivered to a turbine so as to actuate the turbine and to generate electricity therefrom. The gaseous constituents pass from the turbine into a boiler. An oxygen-containing gas is mixed with the gaseous constituents within the boiler so as to produce pressurized steam. This pressurized steam is passed to a turbine so as to produce electricity. The inert gas is argon.

20 Claims, 1 Drawing Sheet

APPARATUS AND METHOD FOR THE DESTRUCTION OF WASTE

TECHNICAL FIELD

The present invention relates to apparatus and methods for the disposal and destruction of waste. More particularly, the present invention relates to apparatus and methods in which the waste product is pressurized and heated such that the waste is destroyed. Additionally, the present invention relates to apparatus and methods for waste disposal that gasify waste in an oxygen-free environment.

BACKGROUND ART

Garbage and waste are produced in communities in great quantities. This garbage and waste must be disposed of in a variety of ways. The disposal of various kinds of garbage and waste in large quantities in cities is one of the important new administrative problems facing city government. Typical methods for the disposal of garbage include discharging garbage into the sea for reclamation and burying garbage underground. However, there are great problems, such as pollution of sea water and difficulty in getting land, associated with these methods. The general trend at present is directed toward the disposal of garbage by complete incineration. However, and unfortunately, the prevailing technique for the disposal of garbage is by incineration, a method used which burns garbage on fire grates with large quantities of air supplied, thus creating a number of associated problems.

It has been found that the use of large quantities of air produces large quantities of exhaust gases, thereby creating and exacerbating air pollution. Since the combustion temperature of garbage is relatively low, the residue of burnt garbage cannot be made completely harmless. A great deal of environmental pollution is caused by such effluents from this incineration process. Since the combustion of garbage on fire grates is unstable, the efficiency of heat recovery is low and it is difficult to effectively use the heat generated by the combustion and garbage. Additionally, vast space is occupied by the fire grates. This requires a large area for the combustion site. Furthermore, there is a difficulty in getting the sites for the construction of large incinerating plants because of the environmental problems associated therewith.

Recently, disposal methods have been proposed which attempt to solve some of the problems associated with thermal decomposition. Essentially, the garbage is introduced into an incinerator with the heat necessary for thermal decomposition so as to produce a generated slag and gas. There are two processes that are available—a process which uses external heat as an intense heat source necessary for thermal decomposition and a process which utilizes heat generated by the partial oxidation of the garbage with air or oxygen supplied. In the former process, since an external heat is used, the problem lies in economy. In the latter process, since combustion gas gets mixed with generated gas, the calorific value of generated gas is decreased, disadvantageously making the usefulness of the generated gas inferior to that of the former process.

Another problem facing city governments is the disposal of toxic or hazardous materials, such as polychlorinated biphenyls (PCB's). These are toxic and hazardous compounds whose use is being withdrawn or prohibited because of the irreversible harm to the health and the environment. These materials must be managed and disposed of effectively. In addition to polychlorinated biphenyls, there are also organophosphorous, organonitrogen, and organometallic compounds, as well as other materials, that exist in massive quantities and demand effective means of disposal. The majority of the toxic compounds are in a complex matrix format often combining organic and inorganic compounds or fractions, and in these cases, little or no disposal technology is available.

Various methods have been used for disposing of these toxic wastes, including thermal destruction, chemical detoxification, long-term encapsulation and specific landfill methods. With the exception of high temperature incineration, little success has been demonstrated for the safe disposal of highly toxic or extremely persistent waste, such as PCB's. The methods that have been tried have either not been able to handle anything but homogenous waste feed streams or they have only been able to handle relatively low concentrations of toxic compounds in the waste materials. Further, very few of the disposal methods tried to date have been able to develop to operate on a commercial scale.

Of the many methods tried for the disposal of toxic or hazardous wastes, thermal destruction has been the most promising. However, the toxic waste materials are usually very stable organic molecules, and they require long dwell times at high temperatures to effect thermal destruction. Some combustion or incineration systems can achieve the necessary conditions, but the facilities required are very large scale, and often the products of the combustion process present as much of a disposal problem as the original toxic wastes.

In the past, attempts have been made to use electric plasma arcs to destroy toxic wastes. An electric plasma arc system, being essentially pyrolytic, overcomes many of the deficiencies of an incineration or combustion process. The volume of gaseous products produced is much less. As a result, the equipment is substantially smaller in scale. Laboratory demonstrations have shown that a plasma arc is capable of atomizing and ionizing toxic organic compounds, and these atoms and ions usually recombine into simple products. While residual toxic materials are formed, these can be captured, so that no significant amount of toxic material is released to the environment.

Unfortunately, such pyrolytic destruction of waste materials is not suitable for a commercially viable system. Often, the gaseous products that are released into the environment can contribute to various forms of air pollution. In addition, the release of such gases causes concern among the various regulatory authorities in control of the destruction of such toxic materials. Furthermore, and importantly, such plasma arc, pyrolytic methods of waste destruction are extremely costly processes. The cost of the power needed to operate lasers, plasma arcs, or various other methods, cannot be justified on a large scale garbage disposal basis. Furthermore, the by-products of the combustion process are not acquired for later sale or cost offset.

Various United States patents have attempted to address the issue of waste disposal by high temperature incineration process. U.S. Pat. No. 4,665,841, issued on May 19, 1987, describes a municipal trash destruction system in which hydraulic systems move the rubbish, garbage, and other municipal trash into a processor. The processor includes a trash processing zone, a fractionating system, a combustion zone, a heating exchange zone, a waste heat recovery system, and a precipitator for cleaning the emissions prior to release into the atmosphere. U.S. Pat. No. 4,644,877, issued on Feb. 24, 1987, describes the pyrolytic destruction of toxic and hazardous waste materials. The waste materials are fed into a plasma arc burner where they are atomized and ionized. These materials are then discharged into a reaction chamber to be cooled and recombined into product gas and particulate matter. The product gas is then extracted from the recombining products using a scrubber. The product gas may then be burned and utilized as a fuel U.S. Pat. No. 4,695,448, issued on Sept. 22, 1987, describes the dissociating of toxic compounds by an electric arc (e.g. 12,000°F.) in an airtight chamber charged with oxygen. U.S. Pat. No. 4,759,300, issued on July 26, 1988, shows a method and apparatus for the pyrolysis of waste products. In this invention, the waste materials to be pyrolyzed are efficiently dehydrated prior to introduction into the pyrolysis retort using microwaves generated by a large microwave generator. After the waste material is dried, the initial ignition of the material is accomplished by using a high intensity laser beam. Laser ignition is continued until sufficient methane and other volatile gases are produced for burning in a burner unit to sustain the pyrolysis reaction. U.S. Pat. No. 4,667,609, issued on May 26, 1987, describes the destruction of soil contaminated with hydrocarbons by passing the material through a sealed, negatively pressurized, high temperature furnace. The temperature in one zone of this process is maintained at 2,900°F. so as to effectively destroy the contaminating hydrocarbons. U.S. Pat. No. 3,575,119 shows an apparatus for disintegrating and incinerating a concentrated slurry of solid organic material. Material passes through an arcuate tunnel having a plurality of arc electrodes spaced therealong. These electrodes cause the temperature to abruptly raise from about 2,000°F. to about 15,000°F. so as to dissolve the bonds between the carbon and the other atoms.

The present inventor, on June 19, 1990, received U.S. Pat. No. 4,934,286 for an apparatus and method for the disposal of waste. This process for the disposal of waste comprised the steps of passing the waste into a sealed container, purging the sealed container of oxygen, heating the interior of the sealed container to a temperature of greater than 2,700°F. so as to convert the waste into a gas, and transmitting the gas into a storage vessel. An inert gas was introduced into the interior of the sealed container so to displace oxygen from the sealed container. The gas was then eventually sieved so as to separate the various gaseous components for individual storage.

It is an object of the present invention to provide a waste disposal system that effectively dissociates the waste material into its gaseous constituents.

It is another object of the present invention to provide a waste disposal system that effectively operates as a co-generation system.

It is still a further object of the present invention to provide a waste disposal system that effectively dissociates organic wastes without the application of high temperatures.

It is a further object of the present invention to destroy organic wastes in an oxygen-free environment.

These and other objects and advantages of the present invention will become apparent from a reading of the attached specification and appended claims.

SUMMARY OF THE INVENTION

The present invention is a method and apparatus for the disposal and destruction of waste. The method of the present invention comprises the steps of: (1) passing an organic waste into a chamber; (2) pumping an inert gas into the chamber until the pressure within the chamber is at least 10,000 p.s.i.; (3) dissociating the organic waste into gaseous constituents; and (4) passing the gaseous constituents from the chamber. This process also includes the step of heating the chamber to a temperature in excess of 300°F. prior to the step of dissociating the organic waste.

The method of the present invention initially requires that the chamber be filled with an organic gas so as to displace oxygen from the chamber. When the chamber is filled with the inert gas, the oxygen can be released from the chamber leaving only inert gas contained therein. It is important to the operation of the present invention that the dissociation process be carried out in an oxygen-free environment.

The step of pumping comprises pressurizing the waste-containing chamber with an inert gas such that the pressure within the chamber is greater than 25,000 p.s.i. In the preferred embodiment of the present invention, this pressure is approximately 30,000 p.s.i. After pressurizing, the organic waste material will become dissociated into its various constituent gases. The gaseous constituents are then delivered to a turbine so as to actuate the turbine. Electricity is then generated from this actuated turbine. The gases can then be passed as exhaust from the turbine into a vessel, such as a boiler. Within the boiler, an oxygen-containing gas, such as air, may then be mixed with the gaseous constituents in the vessel so as to produce steam. The steam may then be passed from this vessel to a turbine. Electricity is then generated from the turbine by virtue of this pressurized steam.

The apparatus of the present invention comprises a chamber, an inert gas supply in fluid communication with the chamber, an organic waste supply in fluid communication with the chamber, a pump connected to the inert gas supply having the capacity to create pressures in excess of 10,000 p.s.i. within the chamber, and a suitable outlet connected to the chamber so as to release the dissociated gases from within the chamber. A turbine is provided in fluid communication with the outlet so as to generate electricity following the receipt of the pressurized constituent gases. A boiler is also in fluid communication with this outlet so as to receive the dissociated gases. The boiler has an inlet suitable for delivering an oxygen-containing gas, such as air, for mixing within the boiler. The boiler also has a steam outlet suitable for the delivery of pressurized steam to another turbine. A heater is provided with the chamber so as to heat the interior of the chamber to a temperature in excess of 300°F.

In the apparatus of the present invention, the inert gas is, in particular, argon gas. The organic waste supply can be any municipal waste. The outlet includes a rotary valve suitable for releasing the pressurized dissociated gases from the interior of the chamber.

DETAILED DESCRIPTION OF THE INVENTION

Figure 1:
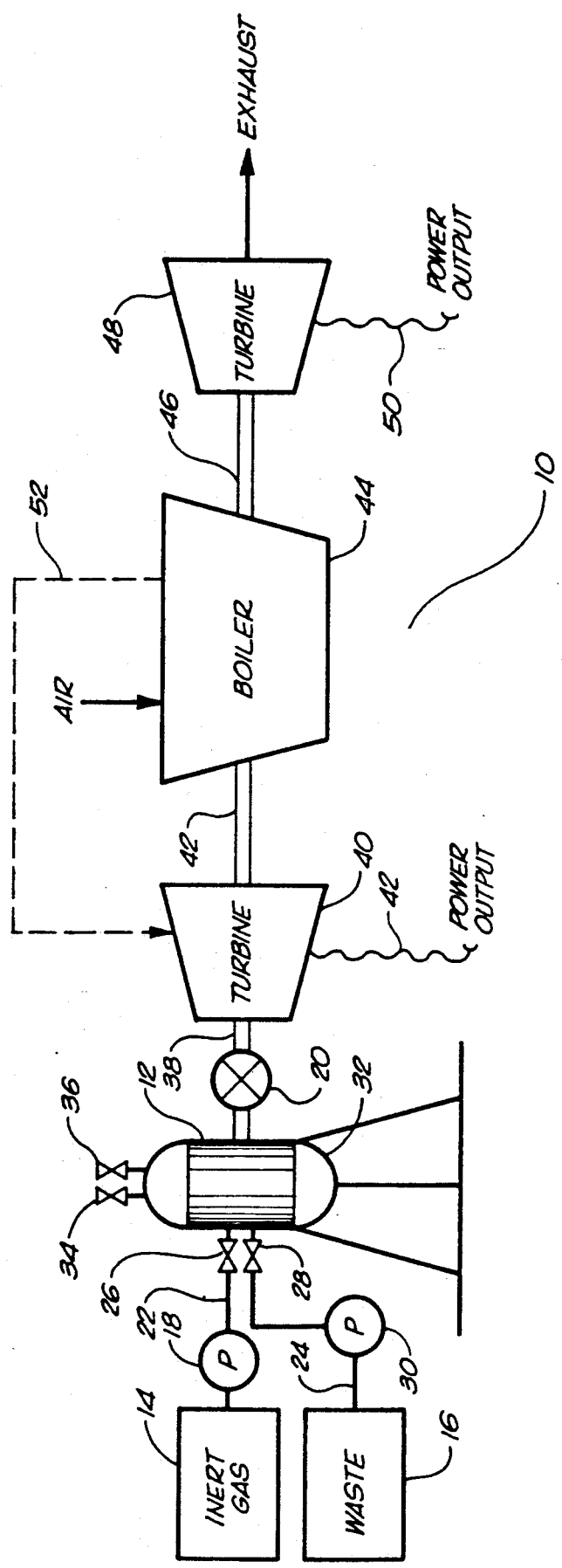
FIG. 1 is a diagrammatic representation of the process and apparatus of the present invention.

Referring to FIG. 1, there is shown at 10, the waste disposal and destruction system in accordance with the preferred embodiment of the present invention. The waste disposal system 10 comprises a chamber 12, an inert gas supply 14, an organic waste supply 16, a pump 18 connected to the inert gas supply 14, and an outlet 20 that is connected to the chamber. The inert gas supply 14 and the organic waste supply 16 are connected by conduits 22 and 24, respectively, so as to be in fluid communication with chamber 12.

The inert gas supply is a supply of argon gas. Although other inert gases can be used within the concept of the present invention, experimentation has shown that argon gas has fewer corrosive effects than do other inert gases, such as nitrogen. Conduit 22 allows the inert gas supply 14 to pass the argon gas into the interior of chamber 12. A valve 26 is provided on conduit 22 so as to properly control the flow of the inert gas into the chamber 12. Pump 18 is connected on the conduit 22. Pump 18 has the capacity to create a pressure in excess of 10,000 p.s.i. within the chamber 12. Ideally, the pump 18 should have the capacity to cause the pressure within the chamber 12 to reach 30,000 p.s.i.

The organic waste supply 16 is connected by conduit 24 to the interior of chamber 12. The organic waste supply 16 may be any source of organic waste, such as a municipal sewage treatment plant. A valve 28 is provided on conduit 24 so as to control the flow of the organic wastes into the interior of chamber 12. A pump 30 is provided so as to cause the organic waste to move through the conduit 24 as required. The pump 30 may be a Triplex pump or an extruder.

Chamber 12 is the apparatus that receives the waste and the inert gas. The chamber 12 acts as the receptacle for the waste and for the gasifying of such waste. As described herein, the chamber 12 is "sealed" since the chamber 12 is part of a closed system. Chamber 12 receives waste into its interior from the waste transport conduit 24. In the preferred embodiment of the present invention, the waste that is delivered into the chamber 12 is a liquid organic waste. Chamber 12 includes a heater 32 having the capacity to cause the interior of the chamber 12 to exceed 300°F. in temperature. As shown in FIG. 1, the heater 32 is positioned below the chamber 12. However, in alternative embodiments of the present invention, the heater 32 may be positioned elsewhere. The only important requirement of the heater 32 of the present invention is that it generate a suitable temperature in an oxygen-free environment so as to work with the pressurization on the interior of the chamber to break down any organic waste into its gaseous constituents. A thermocouple 34 is connected to the chamber 12 so as to monitor the interior temperature of the chamber 12. Thermocouple 34 is any of a variety of suitable pyrometers that have the capacity to measure temperatures. An oxygen analyzer 36 may also be connected to the chamber 12 so as to measure the oxygen content of the atmosphere within the chamber 12. Since it is important to the concept of the present invention that the destruction of waste occur in an oxygen-free environment, the oxygen analyzer 36 is required to provide an indication of when the oxygen is effectively purged from the interior of chamber 12. Pipe 38 communicates with the interior of the chamber 12 so as to cause the gaseous composition produced by the dissociation of the waste materials to pass from the chamber 12. After the organic waste has been effectively dissociated within the chamber 12, the resulting complex composition of gases will pass outwardly from the chamber 12 through line 38. A rotary valve 20 is provided on pipe 38 so as to allow the high pressure gas within the chamber 12 to pass from the chamber into pipe SB. when the rotary valve 20 is opened, extremely high pressure gas will pass from the chamber 12 toward the turbine 40.

The turbine 40 is an electric generator. Turbine 40 is powered by the action of the hot pressurized gaseous constituents that were produced from the original organic waste and as combined with the inert gas. Electrical energy as produced by the action of turbine 40 is passed along line 41 as power output. Line 41 may be connected with conventional electrical transmission facilities so that the turbine 40 will act as an electric co-generator. The use of the turbine 40, and its ability to produce power, provides an additional benefit to the present system. The ability to co-generate offsets much of the cost involved in the operation of the present system.

After the hot pressurized gases actuate the turbine 40, these gases are passed through line 42 into a vessel 44. Vessel 44 is conventionally designated as a boiler. In the vessel 44, the hot pressurized dissociated gases are mixed with an oxygen-containing gas. For example, the boiler 44 can have an inlet which allows the flow of air into the boiler 44. In the presence of oxygen, the dissociated gases will react quite strongly. The presence of oxygen will cause the dissociated gases to generate great heat and further pressure. The gases pass from the boiler 44 through conduit 46 into another turbine 48. Specifically, the gas that passes from boiler 44 is generally known as pressurized steam. In a conventional fashion, the turbine 48 will receive and utilize this pressurized steam. The turbine will then generate electrical energy based upon this steam power. The electrical energy is passed through line 50 as power output from the system. The remaining steam is exhausted harmlessly into the atmosphere.

FIG. 1 further shows an alternative embodiment of the present invention by the dotted line indicated with the number 52. In this arrangement, the dotted line 52 is utilized to indicate that the boiler 44 may also be connected so as to act on the turbine 40. By a separate line, the steam, as generated by boiler 44, will pass through a line 52 into the turbine 40 so as to provide additional power to the turbine 40. This also eliminates the cost and duplication associated by having two turbines in a similar system. However, from the standpoint of the total amount of energy generated, it was believed that the previous preferred embodiment is the more efficient system.

The present invention is also the process for the destruction of these wastes. The process of the present invention is carried out as follows. Initially, the chamber 12 is filled with an inert gas so as to properly displace the oxygen from the chamber. A suitable valve may be provided so as to allow the displaced oxygen to be removed from the chamber. The oxygen analyzer 36 will provide a signal as to when sufficient oxygen has been removed from the chamber.

Once the oxygen is removed from the chamber, the organic waste 16 is pumped into the oxygen-free chamber 12. While this is occurring, the inert gas 14 is also pumped into the chamber. The pumping of the inert gas continues until the pressure within the chamber is at least 10,000 p.s.i. Experiments have indicated that the amount of pressure, in the absence of great heat, should be at least 25,000 p.s.i., or preferably 30,000 p.s.i. However, the amount of pressure required is inversely related to the amount of heat that is applied by heater 32 to the chamber 12. For example, if 800°F. of temperature is applied to the interior of chamber 12, then the amount of pressure required would only be 15,000 p.s.i. Higher temperatures would require even less pressure. However, it is believed that any pressure less than 10,000 p.s.i. would not be an efficient operation of the system of the present invention.

Upon the application of sufficient pressure and sufficient heat, the organic waste within the chamber 12 is dissociated into its various gaseous constituents. These gaseous constituents are passed from the chamber 12 by the opening of the rotary valve 20.

When the gaseous constituents are passed to the turbine 40, these gases serve to actuate the turbine so as to generate electricity. It is the hot pressurized flow of a gaseous fluid that causes the turbine to rotate at very high speeds so as to generate power. After the dissociated gases have actuated the turbine, these gases flow, as exhaust, from the turbine 40, through line 42, and into the boiler 44. When these gases arrive in the boiler 44, they are mixed with an oxygen-containing gas, such as air. The rapid communication of the oxygen from the air and the dissociated gases causes an immediate and powerful generation of steam. This steam generation further pressurizes the system. By opening suitable valves, the steam from boiler 44 will pass through line 46 and into the turbine 48. In the same manner, as described herein previously, the hot steam will actuate the turbine 48 so as to generate electricity and a suitable power output.

The apparatus and method of the present invention provides an effective method for the destruction and disposal of waste. By effectively converting the waste into the gaseous constituents, the problems associated with the disposal of such wastes are eliminated. Since the byproduct of the present system is steam, there are no harmful pollutants created by this process. Additionally, the pressurized destruction of the waste further is made efficient by the processing of the pressurized gases through turbines. The turbines help to generate electricity and thus serve as an effective co-generator for the overall system. The electricity produced by co-generation can effectively offset much of the cost associated with the operation of the system.

Since the present system operates on a continuous basis, a great deal of energy can be effectively produced through the destruction of the waste. Since the present invention requires relatively low temperatures, the costs associated with providing a great deal of heat are eliminated. Also, the present invention is a safer system since the heat applied to the destruction of the waste is much less than found in other systems.

The foregoing disclosure and description of the invention is illustrative and explanatory thereof, and various changes in the method steps, as well as in the details of the illustrated apparatus, may be made within the scope of the appended claims without departing from the true spirit of the invention. The present invention should only be limited by the following claims and their legal equivalents.

I claim:

1. A process for the destruction of waste comprising the steps of:

passing an organic waste into a chamber;
   pumping an inert gas into said chamber until the pressure within said chamber is at least 10,000 pounds per square inch;
   dissociating said organic waste into gaseous constituents; and
   passing the gaseous constituents from said chamber.

2. The process of claim 1, further comprising the steps of:

filling said chamber with an inert gas so as to displace oxygen from said chamber; and
   removing the displaced oxygen from said chamber.

3. The process of claim 1, further comprising the step of:

heating said chamber to a temperature in excess of 300°F. prior to the step of dissociating said organic waste.

4. The process of claim 1, said step of pumping comprising:

pressurizing the waste-containing chamber with said inert gas to a pressure of greater than 25,000 pounds per square inch.

5. The process of claim 4, said pressure being approximately 30,000 pounds per square inch.

6. The process of claim 1, further comprising the steps of:

delivering the gaseous constituents to a turbine so as to actuate said turbine; and
   generating electricity from the actuated turbine.

7. The process of claim 6, further comprising the steps of:

passing the gaseous constituents from said turbine into a vessel; and
   mixing an oxygen-containing gas with said gaseous constituents in said vessel so as to produce steam.

8. The process of claim 7, further comprising the steps of:

passing the steam from said vessel to a turbine; and
   generating electricity from said turbine.

9. The process of claim 1, further comprising the steps of:

passing the gaseous constituents from said chamber to a vessel;
   mixing an oxygen-containing gas with said gaseous constituents in said vessel so as to produce steam; and
   passing said steam to a turbine so as to produce electricity.

10. A process for the destruction of waste comprising:

passing an organic waste to an oxygen-free chamber;
    pressurizing the organic waste-containing chamber to a pressure in excess of 10,000 pounds per square inch;
    heating said chamber to a temperature of greater than 300°F.;
    dissociating the organic waste into gaseous constituents; and
    passing the gaseous constituents from said chamber.

11. The process of claim 10, said step of pressurizing comprising:

pumping an inert gas into the organic waste-containing chamber to a pressure sufficient to dissociate the organic waste.

12. The process of claim 11, said pressure being approximately 30,000 pounds per square inch.

13. The process of claim 11, said inert gas being argon.

14. The process of claim 10, further comprising the steps of:
   passing the gaseous constituents to a turbine;
   actuating said turbine with the gaseous constituents; and
   generating electricity by the gaseous constituent actuated turbine.

15. The process of claim 10, further comprising the step of:
   mixing the gaseous constituents with an oxygen-containing gas so as to produce steam.

16. An apparatus for the destruction of waste comprising:
   a chamber;
   an inert gas supply in fluid communication with said chamber;
   an organic waste supply in fluid communication with said chamber:
   a pump connected to said inert gas supply having the capacity to create in excess of 10,000 pounds per square inch within said chamber; and
   an outlet means connected to said chamber suitable for releasing dissociated gases from said chamber.

17. The apparatus of claim 16, further comprising:
   a turbine in fluid communication with said outlet means, said turbine capable of generating electricity in the presence of a pressurized gas.

18. The apparatus of claim 17, further comprising:
   a boiler in fluid communication with said outlet means so as to receive said dissociated gases, said boiler having an inlet suitable for delivering an oxygen-containing gas for mixing within said boiler, said boiler having a steam outlet, said steam outlet in fluid communication with said turbine for delivering pressurized steam to said turbine.

19. The apparatus of claim 16, further comprising:
   a heater interactive with said chamber, said heater capable of producing a temperature in excess of 300°F. within the interior of said chamber.

20. The process of claim 16, said inert gas supply being a supply of argon gas, said pump having the capacity to create 30,000 pounds per square inch of pressure within said chamber, said outlet means comprising a rotary valve.

* * * * *